(12) United States Patent
Schienbein et al.

(10) Patent No.: US 6,772,589 B2
(45) Date of Patent: Aug. 10, 2004

(54) HYDRAULIC SYSTEM WITH VARIABLE FLUID FLOW UNDER PRESSURE TO FLUID-OPERATED CONSUMERS

(75) Inventors: Oliver Schienbein, Wiehe (DE); Matthias Kanter, Obertrebra (DE)

(73) Assignee: Demag Ergotech Wiehe GmbH, Wiehe (DE)

( * ) Notice: Subject to any disclaimer, the term of this patent is extended or adjusted under 35 U.S.C. 154(b) by 0 days.

(21) Appl. No.: 10/218,436

(22) Filed: Aug. 14, 2002

(65) Prior Publication Data

US 2003/0037545 A1 Feb. 27, 2003

(30) Foreign Application Priority Data

Aug. 23, 2001 (DE) .......................... 101 41 351

(51) Int. Cl.[7] .............................................. F16D 31/02

(52) U.S. Cl. .......................................... 60/421; 60/429

(58) Field of Search .................... 60/421, 429

(56) References Cited

U.S. PATENT DOCUMENTS 4,819,430 A * 4/1989 Becker ........................ 60/421
5,634,334 A * 6/1997 Hehl ............................ 60/429

FOREIGN PATENT DOCUMENTS

| DE | 196 51 510 A1 | 10/1997 |
| DE | 196 21 907 A1 | 12/1997 |
| DE | 199 24 473 A1 | 11/2000 |

* cited by examiner

*Primary Examiner*—Edward K. Look
*Assistant Examiner*—Michael Leslie
(74) *Attorney, Agent, or Firm*—Henry M. Feiereisen

(57) ABSTRACT

A hydraulic system includes at least two consumers, e.g., a closing unit and an injection unit of an injection molding machine. At least two displacement pumps are provided to produce a fluid flow under pressure to the consumers, whereby at least one control valve is provided for each of the consumers. At least one further valve is provided to control a fluid communication between the output sides of the displacement pumps, wherein at least one of the consumers is supplied with pressure from the outlet of the displacement pumps separately or together in groups.

15 Claims, 1 Drawing Sheet

HYDRAULIC SYSTEM WITH VARIABLE FLUID FLOW UNDER PRESSURE TO FLUID-OPERATED CONSUMERS

CROSS-REFERENCES TO RELATED APPLICATIONS

This application claims the priority of German Patent Application, Serial No. 101 41 351.3, filed Aug. 23, 2001, pursuant to 35 U.S.C. 119(a)–(d), the subject matter of which is incorporated herein by reference.

BACKGROUND OF THE INVENTION

The present invention relates, in general, to a hydraulic system, and in particular to a hydraulic system for providing a fluid under pressure to consumers of an injection molding machine.

German patent publication DE 196 21 907 A1 describes a hydraulic system, in particular for an injection molding machine, including two variable displacement pumps which are each driven via respective couplings by an electric motor. The output sides of the displacement pumps can be interconnected by a valve. Each displacement pump is fluidly connected by a pressure line to a number of consumers via valves. When the pressure lines are not connected together, their pressure is normally different. This conventional hydraulic system suffers shortcomings because the supply of consumers, connected to the same displacement pump, is no longer assured, when a pressure drop is encountered in one of those consumers. In the event the pressure lines of the displacement pumps are connected together, the supply to all consumers of the hydraulic system can then no longer be assured.

It would therefore be desirable and advantageous to provide an improved hydraulic system to obviate prior art shortcomings and to ensure a supply of consumers, even if a breakdown in one of the consumers is encountered.

SUMMARY OF THE INVENTION

According to one aspect of the present invention, a hydraulic system, in particular for an injection molding machine, includes at least two consumers, at least two displacement pumps, at least one first control valve for each of the consumers, and at least one second valve for controlling a fluid communication between the outlet sides of the displacement pumps, wherein at least one of the consumers can be supplied with pressure from the outlet side of the displacement pumps separately or together in groups.

The present invention resolves prior art problems by supplying a consumer with fluid under pressure from the output side of at least two displacement pumps, preferably via a 2/2 directional control valve, whereby the pressure to the consumer from the outlet of the displacement pumps can be supplied separately or together. When a pressure drop is encountered in the pressure line of one of the displacement pumps, the other pressure line of another displacement pump is still under pressure. In the event, two or more pressure lines are connected together, the pressure line encountering a pressure drop is simply cut.

Suitably, the hydraulic system has two displacement pumps, wherein the output pressure of the displacement pumps is supplied to each of two consumers via two valves. Of course, the hydraulic system may have more than two displacement pumps whose output pressure can be supplied to all consumers. When using a hydraulic system in combination with an injection molding machine, costs and economical considerations dictate the use of two consumers—closing unit and injection unit—which are each supplied with the output pressure of two displacement pumps via two 2/2 directional control valves. In the event both 2/2 directional control valves are opened, the pressure on the output side of both displacement pumps is equalized. The displacement pumps are thus effectively connected together.

A hydraulic system according to the present invention has the advantage of a flexible assignment of resources to react to fluctuations in the load distribution. The demand on hydraulic fluid by a closing unit of an injection molding machine as consumer varies, for example, depending on the utilized injection molding tool. Depending on the need of hydraulic fluid under pressure, a displacement pump can be used which offers a pump capacity that suits best the hydraulic demand at hand. Thus, a displacement pump with small pump capacity would be used for a hydraulic cylinder with low hydraulic fluid volume to realize a better control dynamics. When a hydraulic cylinder with great hydraulic fluid volume is involved, both displacement pumps are connected together to reduce the filling time of the hydraulic cylinder and thus the cycle time of the consumer. Depending on the requirements, the operator of the injection molding machine is thus in a position to select an energetically beneficial parallel operation of several consumers or an increase in the operating speed through interconnection of the displacement pumps.

According to another feature of the present invention, the displacement pumps may be configured as electro-hydraulic variable capacity pumps. Hereby, the output pressure of the capacity pump is registered by a pressure sensor and converted into a voltage signal. The voltage signal represents the input variable of the control as an actual value. Computer-controlled programs that can be individually suited to the application at hand can be used to control electro-hydraulic capacity pumps.

According to another feature of the present invention, each of the displacement pumps generates an output variable, with the output variable of one of the displacement pumps representing an actual value which is used as a desired value for the output variable of the other one of the displacement pumps. As a result, both displacement pumps operate that in the so-called "master-slave mode". This type of control has the advantage that the displacement pumps are prevented from mutually building up one another or operate against one another.

According to another feature of the present invention, each of the capacity pumps may be constructed separately for pressure control and fluid flow control.

According to another feature of the present invention, there may be provided a pressure reservoir which is operatively connected to at least one of the consumers. In this way, the displacement pumps can be made smaller in dimension while still temporarily maintaining a high operating speed. Suitably, the pressure reservoir is operatively connected to the injection unit of an injection molding machine, having a high power consumption.

According to another feature of the present invention, there may be provided a drive unit, including an electric motor, for operating the displacement pumps, wherein one displacement pump is positioned on one side of the electric motor, and the other displacement pump is positioned on the other side of the electric motor. In this way, the displacement pumps can be linked by couplings in close distance to the environmentally-friendly drive unit.

According to another feature of the present invention, each of the displacement pumps may generate an output variable commensurate with a desired value which is limited by a maximum driving power of the electric motor. Such a restriction is possible because the power parameters of the individual displacement pumps are known at all times by ascertaining pressure and flow rate. Overloading of the drive unit is hereby avoided.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
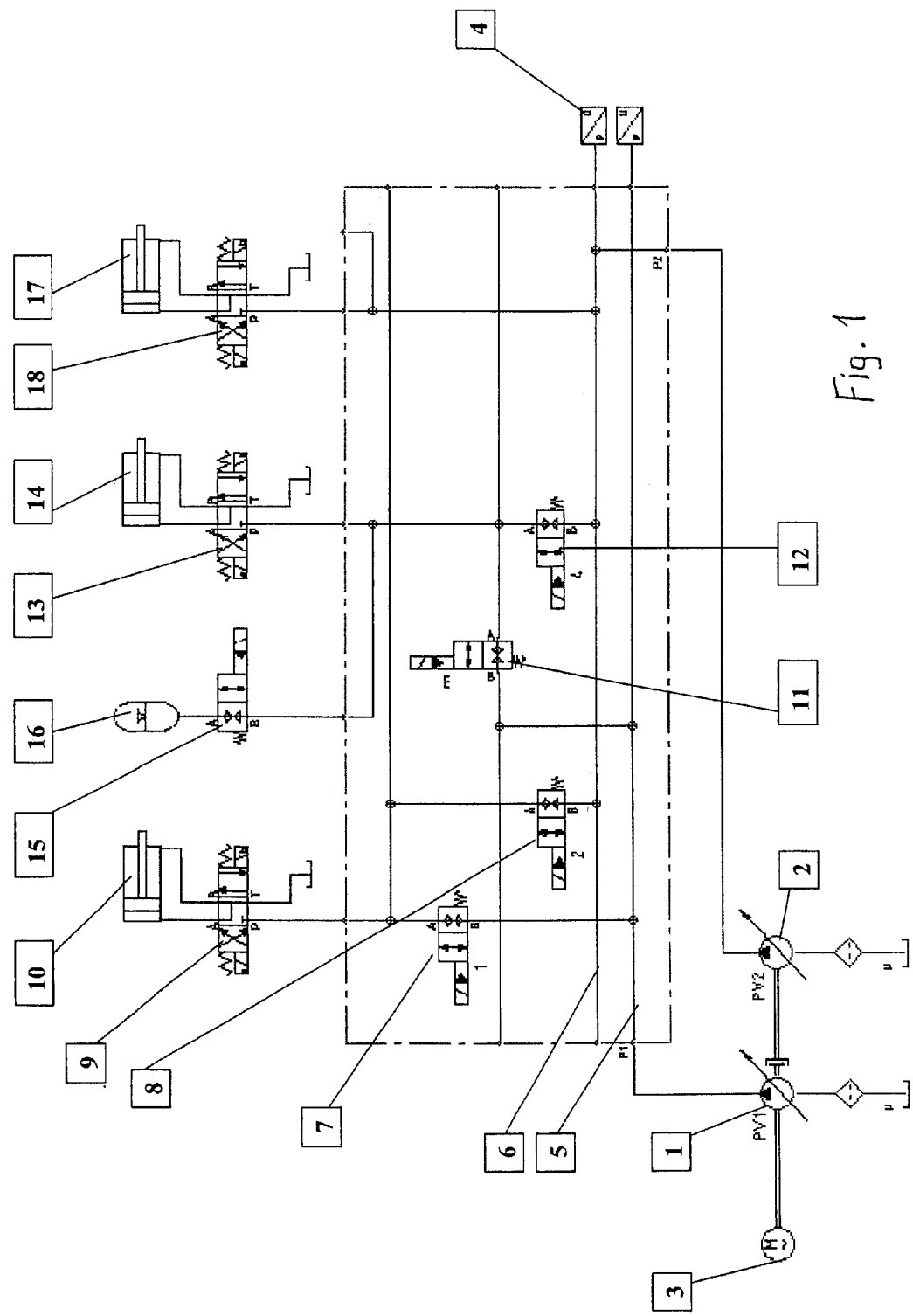
FIGURE 1 is a flow diagram showing the relationship and operation of components of a hydraulic system according to the present invention.

Turning now to FIG. 1, there is shown a flow diagram showing the relationship and operation of components of a hydraulic system according to the present invention. Two displacement pumps 1, 2, e.g. variable capacity pumps, are driven by an electric motor 3. The displacement pumps 1, 2 are controlled electronically and receive from a pressure sensor with pressure-voltage converter 4 a voltage signal commensurate with a pressure on the output side of the displacement pumps 1, 2. The displacement pump 1 pumps hydraulic fluid through a hydraulic line 5 at a pressure $p_1$ on the output side whereas the displacement pump 2 pumps hydraulic fluid through a hydraulic line 6 at a pressure $p_2$ on the output side. Normally, the pressures $p_1$, $p_2$ of the displacement pumps 1, 2 are different. The displacement pumps 1, 2 are both connected via a 4/3 directional control valve 9 to a double-acting hydraulic cylinder 10 as a fluid-operated consumer, whereby the fluid flow through the hydraulic line 5 is controlled by a 2/2 directional control valve 7 and the fluid flow through the hydraulic line 6 is controlled by a 2/2 directional control valve 8. Through operation of the 4/3 directional control valve 9, the hydraulic cylinder 10, e.g. of a closing unit of an injection molding machine, can be filled or emptied for actuation of a piston accommodated therein. Depending on whether valve 7 or valve 8 is open, the 4/3 directional control valve 9 of the hydraulic cylinder 10 communicates with the displacement pump 1 or 2, so that hydraulic fluid at pressure $p_1$ or $p_2$ is supplied, i.e. the hydraulic cylinder 10 is acted upon by pressure $p_1$ or $p_2$, when the 4/3 directional control valve 9 is open.

In the event, both valves 7, 8 are open, both hydraulic lines 5, 6 and as a result both displacement pumps 1, 2 are connected together. Therefore, the pressure in both hydraulic lines 5, 6 equalizes, i.e. $p_1=p_2$. The pump capacity of both displacement pumps 1, 2 is combined, i.e. the piston of the hydraulic cylinder 10 is operated at greater speed.

As further shown in FIG. 1, the displacement pumps 1, 2 are further connected via respective 2/2 directional control valves 11, 12 and a 4/3 directional control valve 13 to a double-acting hydraulic cylinder 14, as a further fluid-operated consumer, e.g. an injection unit of a injection molding machine, to allow filing and emptying of the hydraulic cylinder 14 and thus operation of the piston accommodated therein. Disposed in parallel relationship to the 4/3 directional control valve 13 for filling and emptying the hydraulic cylinder 14, is a 2/2 directional control valve 15 for controlling a charging of a pressure reservoir 16. When both valves 11, 12 are open, both hydraulic lines 5, 6 and as a result both displacement pumps 1, 2, are connected together so that the equalized pressure $p_1=p_2$ is established again in the hydraulic lines 5, 6. Thus, the pump capacities of both displacement pumps 1, 2 are combined again, i.e. the piston of the hydraulic cylinder 14 operates at greater speed.

In accordance with the present invention, pressure equalization in the hydraulic lines 5, 6 is thus realized in the hydraulic system as soon as one of the pairs of valves 7, 8 or 11, 12 is open.

A further fluid-operated consumer, e.g. hydraulic cylinder 17, is connected directly to the hydraulic line 6 via a 4/3 directional control valve 18 so that pressure $p_2$ of the displacement pump 2 is acted upon the 4/3 directional control valve 18 at all times, or, when the hydraulic lines 5, 6 are connected together, the pressure $p_2=p_1$.

While the invention has been illustrated and described as embodied in a hydraulic system with variable fluid flow under pressure to fluid-operated consumers, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A hydraulic system for an injection molding machine, comprising:
    at least two fluid-operated consumers:
    at least two displacement pumps, each having an output side;
    at least one first control valve for each of the consumers; and
    at least one second valve for controlling a fluid communication between the outlet sides of the displacement pumps,
    wherein at least one of the consumers is supplied with pressure from the outlet sides of the displacement pumps individually or together in groups.

2. The hydraulic system of claim 1, wherein the second valve is a 2/2 directional control valve.

3. The hydraulic system of claim 1, wherein the first valve is a 4/3 directional control valve.

4. The hydraulic system of claim 1, wherein the displacement pumps are electro-hydraulic variable capacity pumps.

5. The hydraulic system of claim 1, wherein each of the displacement pumps generates an output variable, with the output variable of one of the displacement pumps representing an actual value which is used as a desired value for the output variable of the other one of the displacement pumps.

6. The hydraulic system of claim 3, wherein each of the capacity pumps is constructed separately for pressure control and fluid flow control.

7. The hydraulic system of claim 1, wherein the pressure on the output sides of the displacement pumps is supplied to each of the consumers via two said second valves.

8. The hydraulic system of claim 1, and further comprising a pressure reservoir operatively connected to at least one of the consumers.

9. The hydraulic system of claim 1, and further comprising a drive unit, including an electric motor, for operating the displacement pumps, wherein one displacement pump is positioned on one side of the electric motor, and the other displacement pump is positioned on the other side of the electric motor.

10. The hydraulic system of claim 9, wherein each of the displacement pumps generates an output variable commensurate with a desired value which is limited by a maximum driving power of the drive unit.

11. A hydraulic system, comprising:
   at least two fluid-operated consumers;
   at least two displacement pumps;
   passageway means for fluidly connecting the displacement pumps to the consumers;
   control valve means disposed in the passageway means for regulating a flow of fluid under pressure to the consumer in such a way that each of the consumers is selectively supplyable with fluid under pressure from each one individually or both of the displacement pumps.

12. The hydraulic system of claim 11, wherein the control valve means includes at least two first control valves, one first control valve disposed in the passageway means immediately upstream of one consumer and the other first control valve disposed in the passageway means immediately upstream of the other consumer, and at least two pairs of second control valves, one pair of second control valves disposed in the passageway means between the one first control valve and the displacement pumps, and the other pair of second control valves disposed in the passageway means between the other first control valve and the displacement pumps.

13. The hydraulic system of claim 12, wherein each of the first control valves is a 4/3 directional control valve, and each of the second control valves is a 2/2 directional control valve.

14. The hydraulic system of claim 11, wherein each of the displacement pumps generates an output variable, with the output variable of one of the displacement pumps representing an actual value which is used as a desired value for the output variable of the other one of the displacement pumps.

15. The hydraulic system of claim 12, and further comprising a pressure reservoir disposed in the passageway means between a one of the first control valves and a one of the pairs of second control valves.

* * * * *